Figure 1:
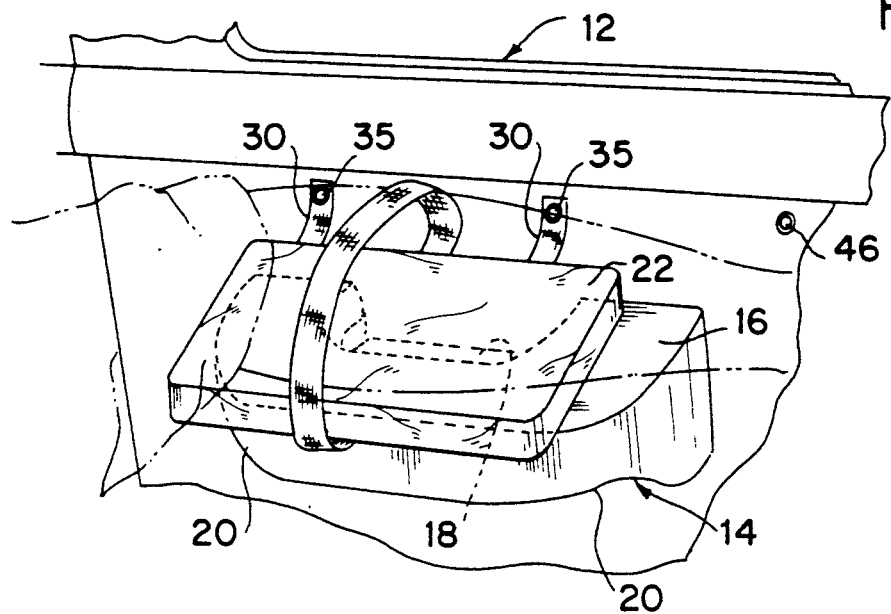

United States Patent [19]

Coates

[11] Patent Number: 5,332,288
[45] Date of Patent: Jul. 26, 1994

[54] DETACHABLE ARM CUSHION FOR AUTOMOBILE ARM REST

[76] Inventor: John H. Coates, 1044 Phoenix St., Greenwood, S.C. 29646

[21] Appl. No.: 121,510

[22] Filed: Sep. 16, 1993

[51] Int. Cl.$^5$ ............................ A47C 7/54; B60N 2/46
[52] U.S. Cl. ....................... 297/411.21; 296/153; 297/227; 297/411.26; 297/411.23
[58] Field of Search .............. 297/227, 411.2, 411.21, 297/411.26, 411.45, 411.46, 411.22, 411.23, 395, 397; 296/153

[56] References Cited

U.S. PATENT DOCUMENTS

| | | | |
|---|---|---|---|
| 1,691,613 | 11/1928 | Roach et al. | 297/411.21 |
| 1,856,868 | 5/1932 | Fry | 297/411.21 X |
| 1,962,508 | 6/1934 | Josselyn | 296/153 |
| 2,877,049 | 3/1959 | Lucas | 297/411.21 X |
| 4,982,921 | 1/1991 | Sanders | 296/153 X |

*Primary Examiner*—Peter R. Brown
*Attorney, Agent, or Firm*—William J. Daniel

[57] ABSTRACT

A portable cushioning accessory for automotive vehicles for cushioning the arm of an occupant of the vehicle resting on the usual arm rest mounted on an inside panel of the vehicle. The accessory includes a cushion having an interior pad of yieldable foamed rubber or synthetic polymer which is elongated to fit on the arm rest surface held within an exterior flexible fabric cover, and anchoring means for anchoring the cushion on the arm rest in the form of two or more anchoring straps, preferably elastic in length, affixed at one end to the cushion at lengthwise spaced apart points along one long side thereof and carrying at their other ends attachment members, e.g. one part of male and female snap fasteners or grippers, for detachable attachment to cooperating attachment members, e.g. the other part of the fasteners or gripers, mounted in a row on the inside vehicle panel above the arm rest at more or less corresponding spaced apart points. Preferably, at least one additional attachment member is provided on the vehicle panel to enable the anchoring strap ends to be shifted between adjacent sets of the panel attachment members and thereby change the position of the cushion lengthwise of the arm rest.

6 Claims, 1 Drawing Sheet

DETACHABLE ARM CUSHION FOR AUTOMOBILE ARM REST

FIELD OF THE INVENTION

This invention relates to the field of automotive accessories and is concerned more particularly with a detachable arm cushion for an occupant, e.g. the driver or passenger, in an automotive vehicle which provides more comfortable support for the elbow or forearm of the occupant while resting on the arm rest of the vehicle.

BACKGROUND OF THE INVENTION

For many years, automobiles, trucks and similar vehicles have been equipped with arm rests mounted on the interior face of the inner panel of the door or other side wall thereof. While the configuration of these arm rests can vary in generally minor respects from one model of vehicle to another, they typically take the form of a shaped block projecting from the interior face of the door or other side panel and anchored by screws or bolts to a part of the frame of the vehicle. When viewed from the top or in plan, they are usually of shallow or laterally elongated U-shape, i.e. with rounded inner corners and a length parallel to the vehicle length greater than their width or interior projection. The top surface of the rest is essentially flat to give support for the elbow or forearm of an occupant sitting in proximity to the side panel. A central portion of the rest adjacent to the side panel may be recessed, or cut away, to form a vertical opening therein to define a hand-well functioning as a hand-grip to enable the occupant to conveniently grasp the same to facilitate opening and closing of the door.

Embodiments of arm rests more or less representative of the usual configurations in the art are shown in U.S. Pat Nos. 2,703,602 and 2,721,605. The latter is specifically concerned with a shaped flexible plastic sheath which fits over a conventional arm rest merely as a protective cover therefor while the former suggests a cover for the rest incorporating a special feature in which a molded rigid plastic outer cover is cut away in a central region thereof which is spaced inwardly of the hand well of the arm rest to form an oval opening through which a portion of an underlying sponge rubber pad and a superposed fabric layer are caused to protrude bulgingly above the top surface of the cover to confer a more rounded and pleasing contour to the top surface. The bulging protrusion of the pad and fabric layer can offer only minimum cushioning action and the patented construction is described as furnishing only comfort that is "comparable . . . to the original arm rest of the automobile."

As may be inferred from the -605 patent, a drawback present in standard automotive arm rests is the absence of genuinely comfortable support for the elbow or forearm of an occupant, particularly during long trips when the elbow or arm is maintained in contact with the rest substantially continuously for several hours or longer. Due to its position and function, the arm rest at least on the driver side tends to receive a substantial amount of wear aggravated by the absorption of perspiration and skin oils from the occupant so that the arm rest is often the first part to show visible evidence of abrasion and cracking. In order to reduce this "wear and tear" and avoid premature deterioration, auto manufacturers have elected to emphasize durability above comfort in the construction of the rest, covering a solid core having the necessary mechanical strength and rigidity with a layer of a durable thick plastic or, in upscale models, leather with a minimum of intervening padding. The resulting units possess a very firm substantially unyielding surface and while they no doubt have high resistance to deterioration, this is achieved at a considerable price in comfortable support for the occupant's arm.

Some efforts have been made in the art to improve the comfort of arm rests. An early proposal is found in U.S. Pat. No. 1,247,547 which discloses a portable pad for the then wooden arms of railway passenger car benches wherein a flexible pad, e.g. of felt, is enclosed within an outer covering of leather or the like and carries pivotally on its underside a spaced pair of downwardly opening C-shaped spring clamps for resiliently and removeably engaging the arm of the bench. Modification of this arrangement for an automotive arm rest would be awkward at best since the hand well of the rest is of limited area and does not always pass entirely through the arm rest, making satisfactory engagement of the spring clamps to the rest difficult to impossible.

In U.S. Pat. No. 2,633,186, an "add-on" detachable shield for the standard arm rest is shown consisting of a molded hollow metal or plastic frame adapted to be slipped over the standard rest and held in place by a downwardly projecting tongue engaging the hand-well of the rest, the exposed top and side faces of the shield being optionally encased by a shallow cushioning pad overlaid by a fabric cover glued or otherwise secured along its margins to the inner surface of the shield. The optional pad when present is held in fixed position and cannot be adjusted to suit the idiosyncratic preferences of different occupants or the same occupant at different times or under different conditions.

Pads have also been proposed for the bottom ledge of the window frame for occupants preferring to drive with the adjacent window open and their arms resting on the window frame. In U.S. Pat. No. 4,890,478, an inverted L-shaped bracket hooks over the open window ledge and carries a rectangular cushioned pad on its top leg resting on the frame as well as an additional secondary padded support secured in vertically adjustable relation on the depending leg of the bracket and projecting into the passenger compartment below the window frame. Given the current overwhelming popularity of air-conditioned vehicles and the pervasive problem of air pollution, it is rare to drive with open windows so that this idea is of limited benefit. Moreover, for vehicles equipped with standard arm rests, as is almost universally the case, the most comfortable position for the secondary interior support of this design has already been preempted.

More recently, in U.S. Pat. No. 4,982,921, an elongated portable pad adapted to rest on an open window ledge is attached along one long side to an edge of a flexible flap that is anchored along its opposite edge, e.g. by means of VELCRO cooperating hook-and-loop fastening means, to the top margins of the door panel. When the window is closed, the pad and flap hang downwardly against the inner side panel of the vehicle while for use on the open window, the pad is swung upwardly by doubling the flap upon itself into operative position resting on the window ledge. In its inoperative position, the pad serves no cushioning function and does not cooperate with the standard arm rest of the vehicle.

OBJECTS OF THE INVENTION

It is the object of the present invention to provide a portable cushion for detachable association with the top surface of the usual arm rest of an automotive vehicle that is removably anchored to the inside wall panel of the vehicle by means of generally vertically extending short flexible anchoring straps fastened at one end thereof to the cushion at lengthwise spaced points and permit the pad to be shifted slightly on the arm rest surface to a position most comfortable for the occupant.

It is further object of the invention to provide an arm cushion that is adapted to be adjusted on the arm rest between at least two positions relative to the lengthwise direction of the vehicle arm rest.

It is a further object of the invention to provide a cushion of the type described above that includes an additional strap attached to the cushion at a point preferably intermediate the flexible straps which is adapted to encircle the arm of the occupant to aid in maintaining the pad in a desired position of maximum comfort for the occupant.

BRIEF DESCRIPTION OF THE ACCOMPANYING DRAWINGS

Figure 2:
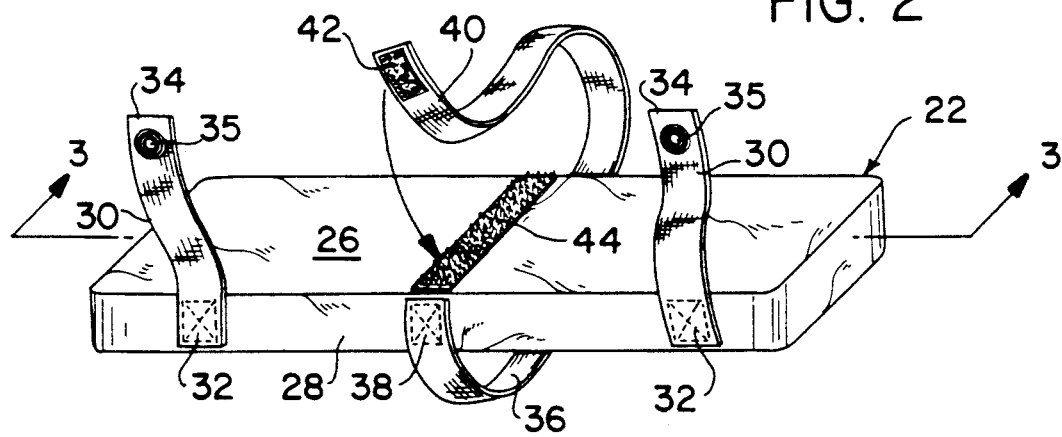
Figure 3:
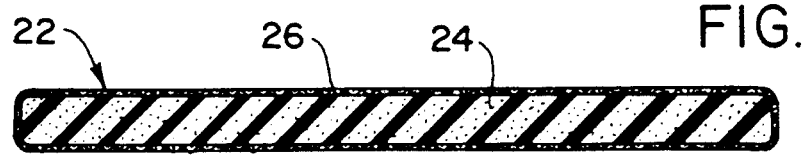

One embodiment illustrating the practical application of the concept of the present invention is shown in the accompanying drawings in which:

FIG. 1 is a fragmentary perspective view showing the cushion of the invention in operative association with the interior side wall panel and conventional arm rest of an automotive vehicle, FIG. 2 is a perspective view of the cushion of the invention alone in inverted and laterally reversed position to reveal certain details of its construction, and FIG. 3 is a cross-sectional view taken lengthwise of the cushion generally along line 3—3 in FIG. 2, showing the interior resilient pad enclosed within a fabric cover.

DESCRIPTION OF ILLUSTRATIVE EMBODIMENT OF THE INVENTION

In FIG. 1 of the drawings, there is shown a fragment of the inside panel 10 of the side wall of an automotive vehicle, which fragment is situated directly below the window frame thereof indicated at 12. The side wall could be of a front or back door of the vehicle or a fixed wall dependent on whether the vehicle has four or two doors. Anchored on the side panel by conventional means not shown is an arm rest 14 of a more or less typical configuration projecting inwardly of the panel and having a length, i.e. a dimension parallel to the length of the vehicle, that is somewhat greater than its interior projection.

The top surface 16 of arm rest 14 is essentially flat with a recessed hand-well, shown in dotted lines at 18, in a central region directly adjacent to side panel 10. When viewed in plan, the top surface 16 is of shallow generally U-shape, its interior corners, i.e. at the bottom of the U, being rounded, as at 20. The vertical separation between the bottom ledge of the window and the location on the inside panel of top face 16 of the arm rest can vary but a certain dimension of the inside panel separates the two since the arm rest needs to be disposed well below the bottom window ledge in order to be located at a comfortable height for supporting the arm of the occupant, According to the invention, an elbow or arm cushion generally designated 22 is provided which is generally elongated in the direction of the vehicle length and thus the length of the arm rest 14 and adapted to rest in movable relation on the top surface 16 of arm rest 14. The cushion 22 is made up of an interior resilient pad, or small "pillow", 24 which is enclosed within an outer cover 26. Cover 26 is preferably made of a reasonably durable fabric woven or knitted from natural or synthetic fibers, such as cotton or nylon, for example. As shown, the interior pad in plan configuration is rectangular, i.e. of a length somewhat greater than its length, with slightly rounded corners, but other shapes could be selected equally well such as oval or semi-oval. It is even possible that the interior pad could be round but that is less desirable because of the elongated nature of the arm rest.

Any freely yieldable or resilient material can be used for the pad, such as sponge or foamed rubber or foamed thermoplastic plastic, for example, foamed polyester or foamed polyurethane, as are employed for furniture or upholstery cushions or pillows for furniture or beds. The pad is preferably made in one piece but it could be composed of shreds or pieces stuffed within the cover. Foamed or sponge rubber as well as foamed plastics are commercially available in a range of weights or foam densities and consequential variations in foam resiliency or yieldability. From this range, a foam can be chosen that has the desired combination of resiliency and recoverability from compression that makes for comfortable support for particular occupants, some of which may prefer a soft cushioning action while others opt for a more firm but still compressible effect.

The thickness of interior pad 24 can very from about one-half inch to an inch or more but very thick pads, e.g. of about two inches or more would tend to hold the arm of the occupant at a less comfortable height and would normally be avoided. The length and width or interior projection of the pad will depend mainly on the dimensions of the vehicle arm rest. Generally speaking, the length will be somewhat less than that of the rest itself while the width will be about the same, i.e. from a little less for deep rests to possibly a little more for shallow rests.

The cover is sized to fit fairly tightly or snugly around the interior pad and can, of course, be stitched, glued, or otherwise fastened along its seams, which have not been shown in the drawings for sake of clarity since they form no part of the invention. A knitted fabric is advantageous in exhibiting a slight degree of stretch that aids in fitting the cover to the contour of the interior pad but woven fabrics are suitable particularly if constructed with stretch or extensible yarns as known in the textile art.

It is conceivable that the cover 26 could be dispensed with and the interior pad modified to have a continuous "skin" on its surface that would serve the same function as the cover 26. However, the presence of a cover is advantageous since it has a more comfortable feel against the skin than a plastic film, can be more readily cleaned or replaced when soiled or worn and can be chosen to coordinate in color or texture with the upholstery of the vehicle.

The cushion 22 of the invention in its operative position rests of the top surface of the arm rest and is detachably secured to the inside panel of the vehicle by anchoring means allowing for some freedom of movement of the cushion relative to the arm rest but without permitting the cushion to be displaced entirely from the surface of the rest. For this purpose, a plurality of short anchoring straps 30 are provided at spaced points along the length of the cushion, each such strap being secured at one end thereof to the cushion and adapted to extend upwardly from the cushion, i.e. towards the window ledge, when the cushion is resting on the top of the arm rest. The other end of each of straps 30 is adapted to be detachably attached or engaged to the face of the inside panel 10 intermediate the bottom window ledge and the top surface of the arm rest.

For convenience, the ends of the straps can be stitched at lengthwise separated points along one side edge 28 of the cover which side edge will in use constitute the side of the cushion that is proximate to the inside panel of the vehicle. This stitching is represented in FIG. 2 by broken lines, as at 32, and as indicated a reinforced pattern of stitching is preferred to minimize the risk of the strap ends pulling free under tension. Other forms of joining the straps to the cushion can be used as well as a different locations on the cushion, e.g. to the underface of the pad cover adjacent the one of its long edges. Incidentally, since the cushion 22 is shown in inverted orientation in FIG. 2, the direction in which the anchoring straps 34 extend relative to the pad 24 and cover 26 is likewise inverted, namely downwardly rather than upwardly. Thus, when the cushion is in its normal orientation as in FIG. 1, the anchoring straps 34 are directed upwardly, being doubled over their stitched ends. Alternatively, the straps 34 can be affixed to the cover, e.g. stitched, in their normal upward direction.

The number of anchoring straps 30 should be at least two and while there can be more than two, there is no perceived advantage achieved with more than two. The length of the anchoring straps can vary dependent, on the one hand, on the degree of mobility or freedom relative to the arm rest that is desired for the cushion and on the other hand the need for a reasonable security in the position of the pad on the arm rest surface. A length of about one inch would probably suffice but about two to three inches is usually preferable. Four or more inches of strap length would likely be excessive. For added mobility of the cushion without loss of positional security, it is preferred that the straps be elastic or stretchable in their length direction. The degree of elasticity is variable but an recoverable extensibility of about 50% is adequate.

Each of the free ends 34 of the anchoring straps 30 is provided with means for attachment thereof to the side panel 10 of the vehicle and a corresponding cooperating attachment means is provided on the side panel 10. The corresponding attachment means are suitably spaced apart in a lengthwise direction, i.e. horizontally of the inside panel, a distance roughly equal to the lengthwise separation of the anchoring straps on the cushion.

As shown, the attachment means are in the form of male and female snap fasteners or grippers 35, one of the male or female members being fixed to the strap end and the other of such members being mounted on the vehicle inside panel. In the operative position seen in FIG. 1, the snap fastener or gripper members 35 on the anchoring strap ends and the inside door panels are engaged together so that only one of the members thereof, i.e. that carried on the ends of the anchoring straps, is visible. It will be understood, however, that a cooperating member for each of the fasteners or grippers on the strap ends is mounted on the door panel even though it happens to be concealed in FIG. 1.

Other attachment means could certainly be substituted, such as strips of VELCRO hook and loop fastening material, as shown in the prior art —921 patent referred to above. Whatever the choice of attachment means, when the strap ends 34 are attached to the side panel 10, the cushion is held generally in place on the top surface of the arm rest. as can be seen in FIG. 1. Detachment of the snap fasteners or other attachment means releases the strap ends and the cushion can then be removed from the vehicle.

If desired, the anchoring straps 30 could be made of different lengths and the positions of the attachment members on the vehicle correspondingly adjusted. However, this gives no apparent advantage and is an added complication, especially where the cushion is intended to be shifted lengthwise between two sets of attachment members on the vehicle panel.

Although, as mentioned, the length of the anchoring straps 30 gives some flexibility in the position of the cushion on the arm rest surface, greater latitude in choice of position is achieved by the provision on the inside panel of the vehicle of one or even more extra attachment means 46 in horizontal alignment with the attachment means needed directly for the strap ends and spaced therefrom either forwardly, as shown in FIG. 1, or rearwardly or both roughly the same distance as that separating the anchoring straps. As seen in FIG. 1, for two anchoring straps 30, there can be three snap fastener members (male or female), including the extra part 46, arranged in a row on inside panel 10. Thus, the fastener members on the two straps can be attached to either the rearward pair or forward pair of the panel fastener members, thereby making available a choice of at least two lengthwise positions for the cushion relative to the length of the arm rest and insuring that a position of maximum comfort can be found by the occupant, by trial and error if needbe. The number of extra attachment means could, of course, be greater than one.

A desirable optional feature for the accessory of the invention is an arm strap 36 that can releasably encircle the forearm of the occupant for added comfort by retaining the cushion in a given position along the forearm. Arm strap 36 is anchored at one end to the exterior cover and is adapted to extend from the underside of the cushion in a loop above its top surface and around the forearm of the occupant with the other or free end thereof adapted to be releasably secured to the cover. The arm strap could be combined with one of the anchoring straps 30 but it is preferred that it be made separate so that it can be located at a point along the length of the pad that is intermediate the positions of the anchoring straps. Such an intermediate position should be more comfortable for the occupant, particularly in the case of more lengthy arm rests. In either case, arm strap 36 is preferably elastic or extensible similar to the anchoring straps 32.

As shown in FIG. 2, wherein as already mentioned, the pad is shown inverted from its normal orientation, one end 38 of arm strap 36 is secured, e.g. by stitching similar to that used for the anchoring straps 30, to the same side edge of the cover 26 as the anchoring straps about halfway in a lengthwise direction between the stitched ends 32 of the anchoring straps. The other end 40 of strap 36 carries fastening means suitable for engagement with cooperating fastening means arranged on the undersurface of the cushion cover either directly or on the fastened end 38 of the arm strap. While different fastening means are possible, such as snap fasteners similar to those on the anchoring straps or buckles, VELCRO hook and loop fastening material is particularly suitable for the arm strap. Thus, one strip 42, i.e. either the looped strip or the hooked strip, of the VELCRO fastening material is attached to the free end 40 of the arm strap and the other strip 44 is mounted on the underside of the cushion cover. Either or both of the strips 42 or 44 could desirably be extended in length to allow the size of the loop of the arm strap to be easily adjusted to fit the arms of different occupants.

In the course of the aforegoing description, a number of variations or modifications have been suggested but it will be appreciated that others are equally conceivable without departing from the spirit of the invention.

That which is claimed is:

1. An arm cushioning automotive accessory for detachable association with the arm rest of an automotive vehicle mounted on an inside panel of the vehicle, said accessory comprising an generally elongated cushion adapted to rest on the top surface of said arm rest and having a yieldable resilient interior pad adapted to fit on the top surface of said arm rest and a flexible exterior cover substantially snugly enclosing said resilient pad; and anchoring means for detachably anchoring said cushion to said vehicle side panel, said anchoring means comprising at least two generally short anchoring straps fastened at one end thereof to said cushion at points which are separated in the lengthwise direction of the cushion a generally predetermined distance, said anchoring straps carrying adjacent each of the other ends thereof an attachment means for detachable attachment to one of at least two cooperating attachment members mounted on said vehicle panel above the top surface of said vehicle arm rest, said cooperating attachment members being arranged on said panel in a row at points separated a distance substantially the same as said predetermined distance.

2. The cushioning accessory of claim 1 wherein the number of cooperating attachment members of the vehicle side panel is greater than the number of anchoring straps whereby said anchoring straps can be attached to different sets of cooperating attachment members to thereby shift the position of the cushion lengthwise of said vehicle arm rest.

3. The cushioning accessory of claim 1 which further comprises an arm strap affixed generally adjacent one end thereof to the underside of said cushion and adapted to extend loopwise above the upperside thereof around the arm of an occupant of said vehicle resting on said cushion, the other end of said arm strap having means for fastening the same to the end affixed to said cushion to enclose the loop around the occupant's arm.

4. The cushioning accessory of claim 3 wherein said one end of said arm strap is affixed to the cushion at a point disposed generally intermediate two of said anchoring straps.

5. The cushioning accessory of claim 1 wherein said interior pad is made of foamed rubber or foamed synthetic polymer.

6. The cushioning accessory of claim 1 wherein said cushion is of generally rectangular plan configuration.

* * * * *